United States Patent [19]

Hehl

[11] Patent Number: 5,157,241
[45] Date of Patent: Oct. 20, 1992

[54] TEMPERATURE CONTROL DEVICE PROVIDED IN A PLASTIC-PROCESSING MACHINE

[76] Inventor: Karl Hehl, Arthur-Hehl-Strasse 32, D-7298 Lossburg 1, Fed. Rep. of Germany

[21] Appl. No.: 519,139

[22] Filed: May 4, 1990

[30] Foreign Application Priority Data

May 5, 1989 [DE] Fed. Rep. of Germany ....... 3914742
Aug. 26, 1989 [EP] European Pat. Off. ........ 89115780.2

[51] Int. Cl.⁵ ............................................. H05B 3/58
[52] U.S. Cl. .................... 219/535; 219/523; 219/550; 165/164; 165/65; 425/143; 425/144
[58] Field of Search ............... 219/535, 550, 523, 201; 165/64, 65, 30, 61, 122, 124; 264/319, 40.6; 425/144, 143, 378 R, 378.1, 379 R, 73, 550, DIG. 13

[56] References Cited

U.S. PATENT DOCUMENTS

| | | |
|---|---|---|
| 2,851,082 | 9/1958 | Charlton . |
| 3,317,958 | 5/1967 | Stroup et al. ........................ 165/64 |
| 3,730,262 | 5/1973 | Drugmand ........................... 165/46 |
| 3,933,200 | 1/1976 | Cunningham ....................... 165/64 |
| 4,112,728 | 9/1978 | Noack et al. ........................ 72/154 |
| 4,131,788 | 12/1978 | Fulbrook ............................ 219/535 |
| 4,479,048 | 10/1984 | Kinoshita ............................ 219/388 |
| 4,480,981 | 11/1984 | Togawa et al. ..................... 425/143 |
| 4,723,070 | 2/1988 | Sikora et al. ........................ 219/535 |
| 4,730,937 | 3/1988 | Hehl .................................... 366/146 |
| 4,763,722 | 8/1988 | Piazzola .............................. 165/64 |
| 4,828,020 | 5/1989 | Guhl et al. .......................... 165/64 |

FOREIGN PATENT DOCUMENTS

| | | |
|---|---|---|
| 1149161 | 5/1963 | Fed. Rep. of Germany . |
| 2236898 | 2/1974 | Fed. Rep. of Germany . |
| 3428539 | 2/1986 | Fed. Rep. of Germany . |
| 3736612 | 5/1989 | Fed. Rep. of Germany . |

Primary Examiner—Bruce A. Reynolds
Assistant Examiner—Tu Hoang
Attorney, Agent, or Firm—Spencer, Frank & Schneider

[57] ABSTRACT

The temperature control device comprises heat transfer shells, each of which consists of two shell sections, each of which consists of a metal casting, in which a single temperature control element is embedded. The temperature control element has been formed from a tubular blank to comprise at least one loop and is formed with locating surfaces, which are exposed to recesses formed in the inside and outside peripheral surfaces of the shell section. Owing to that design the metal castings may be made by die casting under relatively high injection pressures and with a much smaller wall thickness so that the inside peripheral contacting surfaces of the shell sections can much more snugly contact the plasticizing cylinder or the nozzle and a temperature change can be effected at a higher rate.

12 Claims, 12 Drawing Sheets

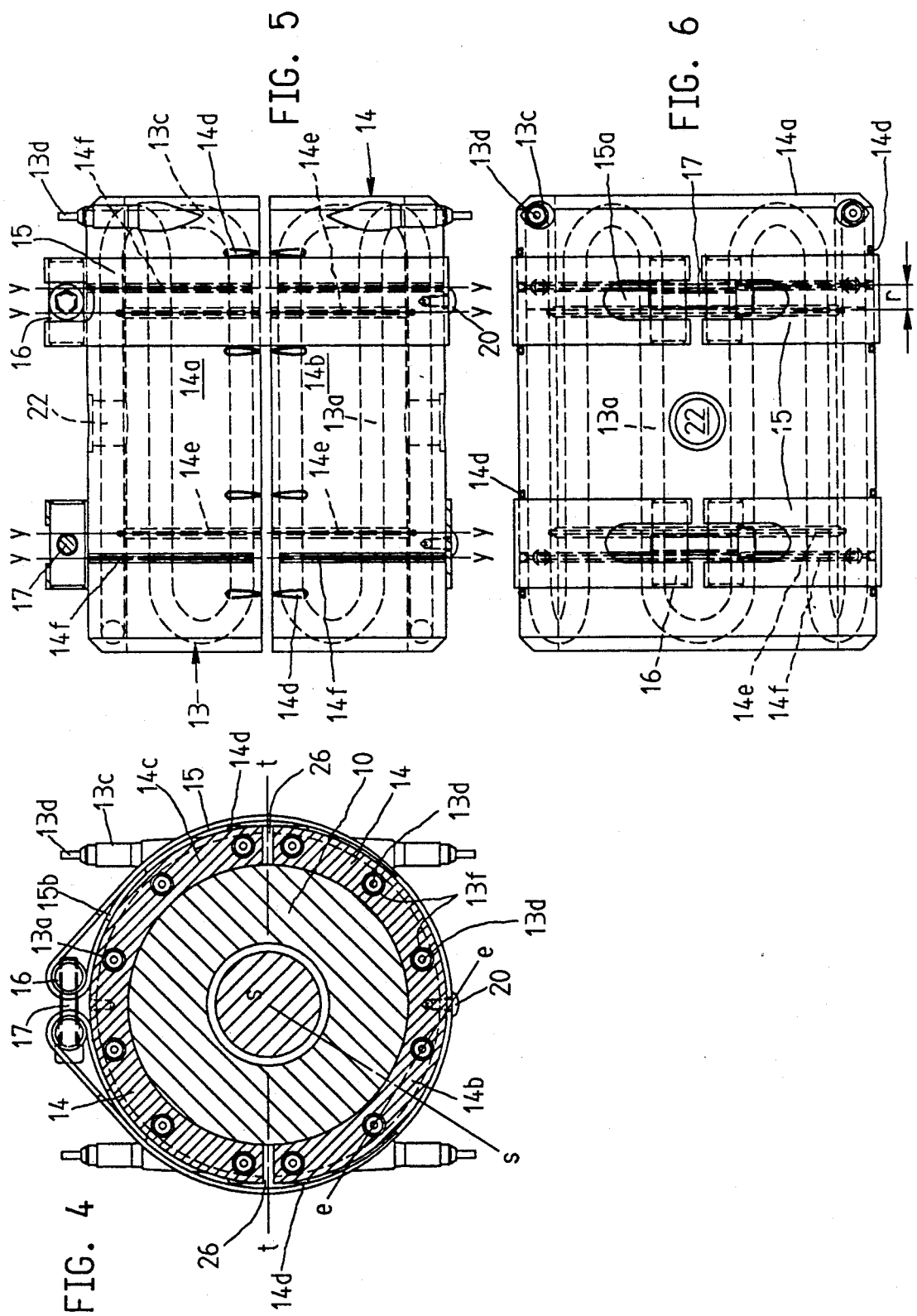

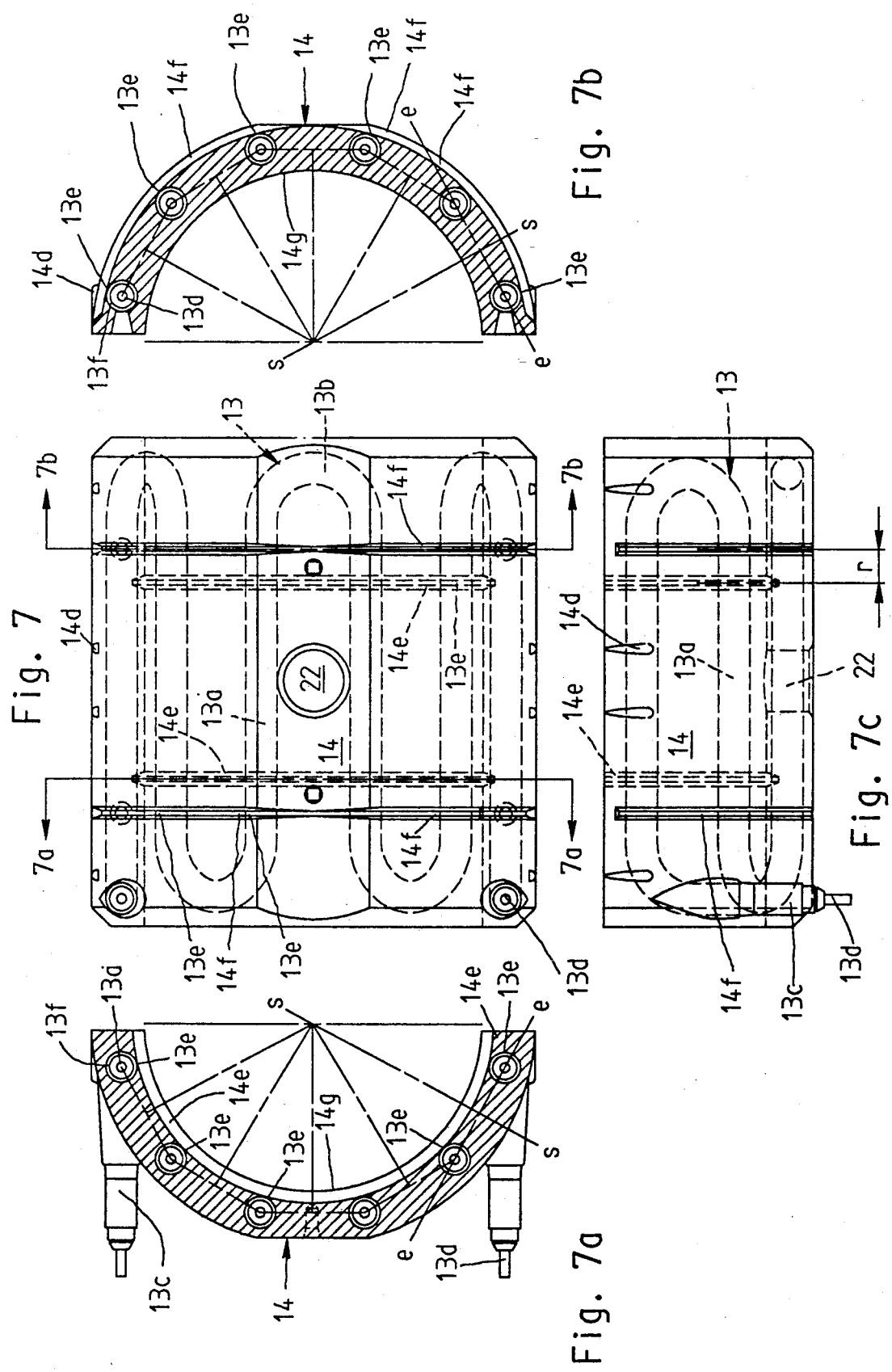

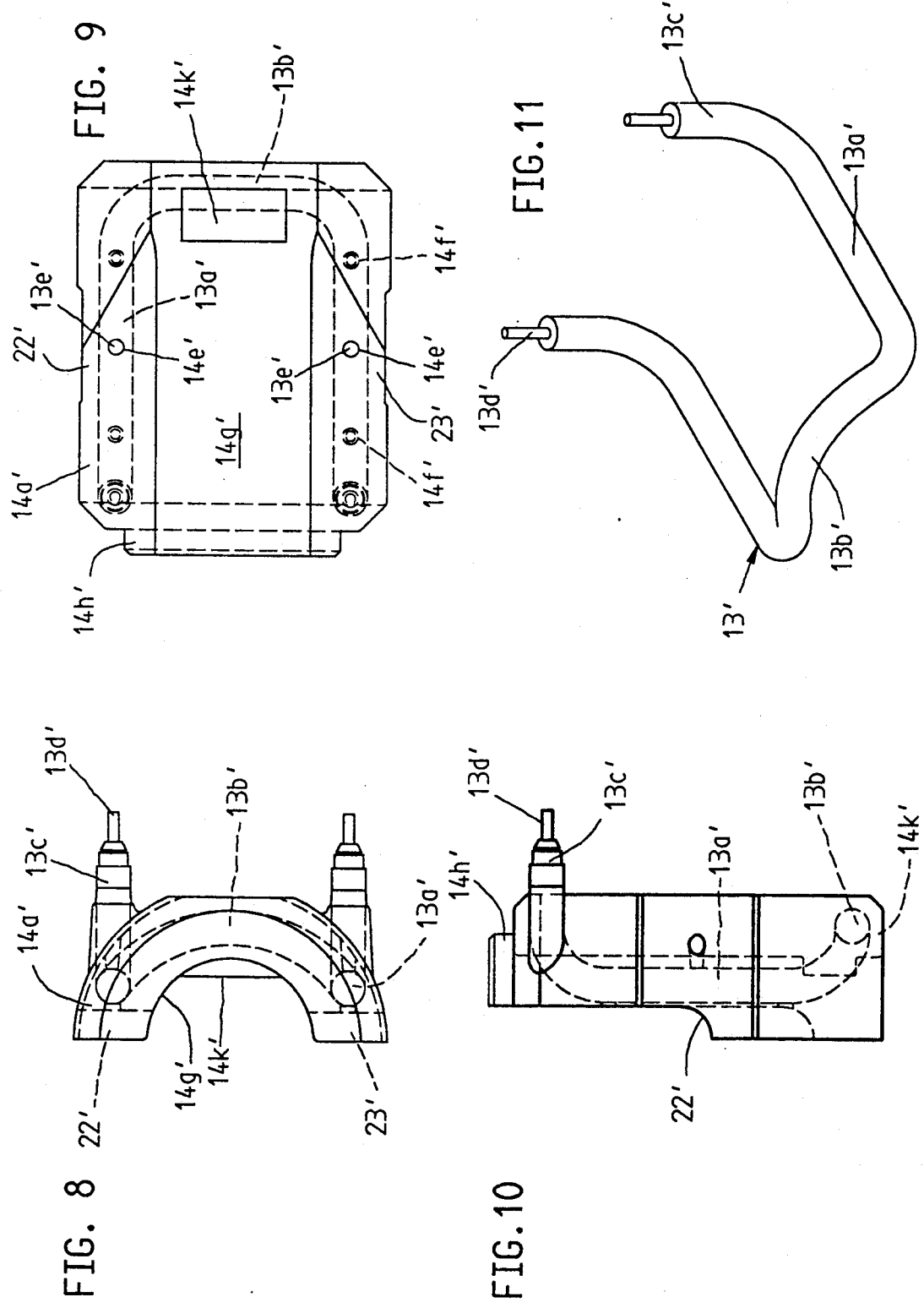

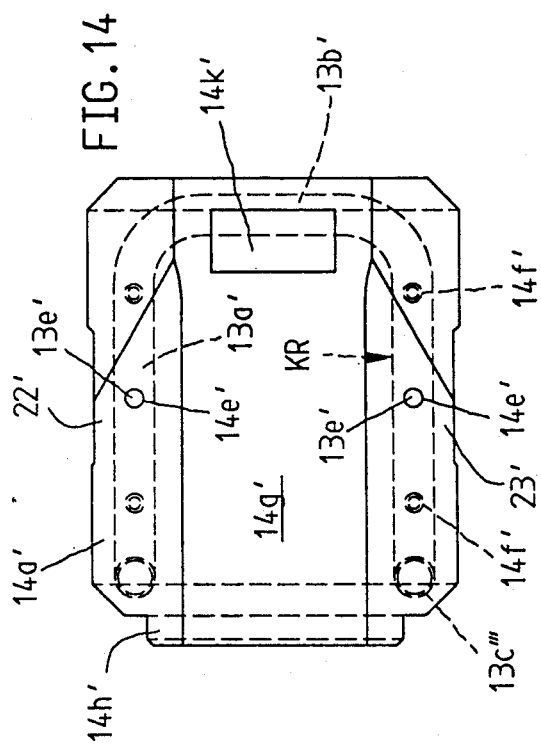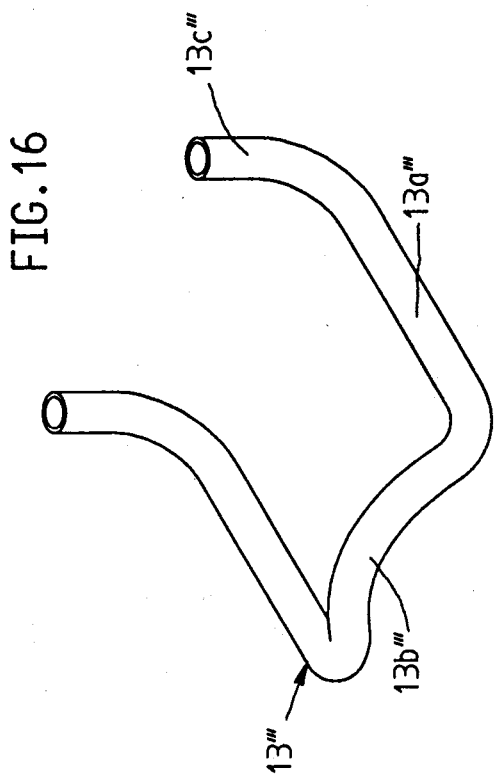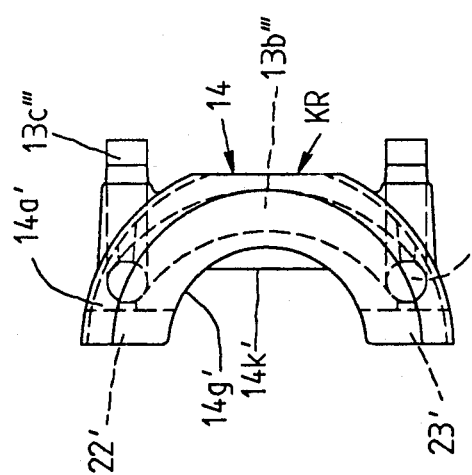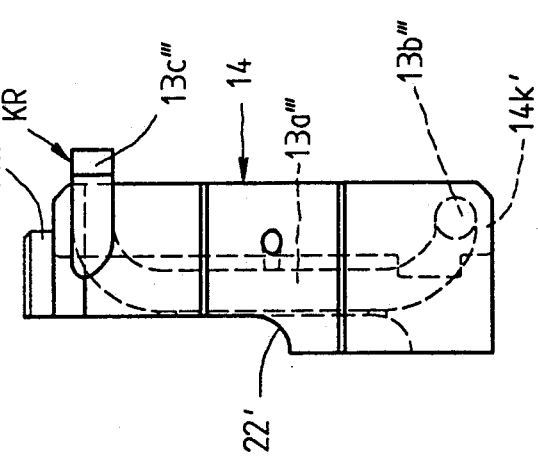

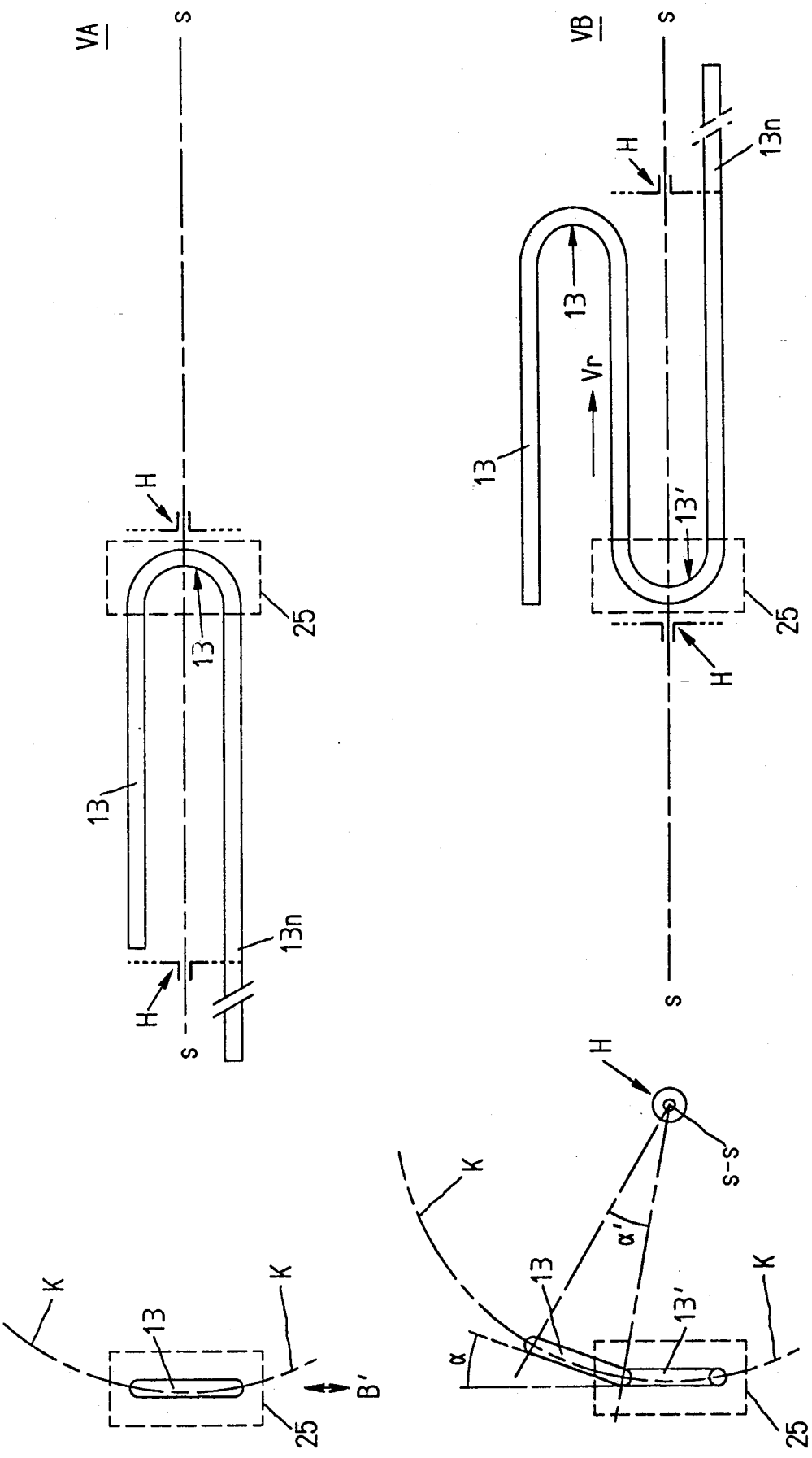

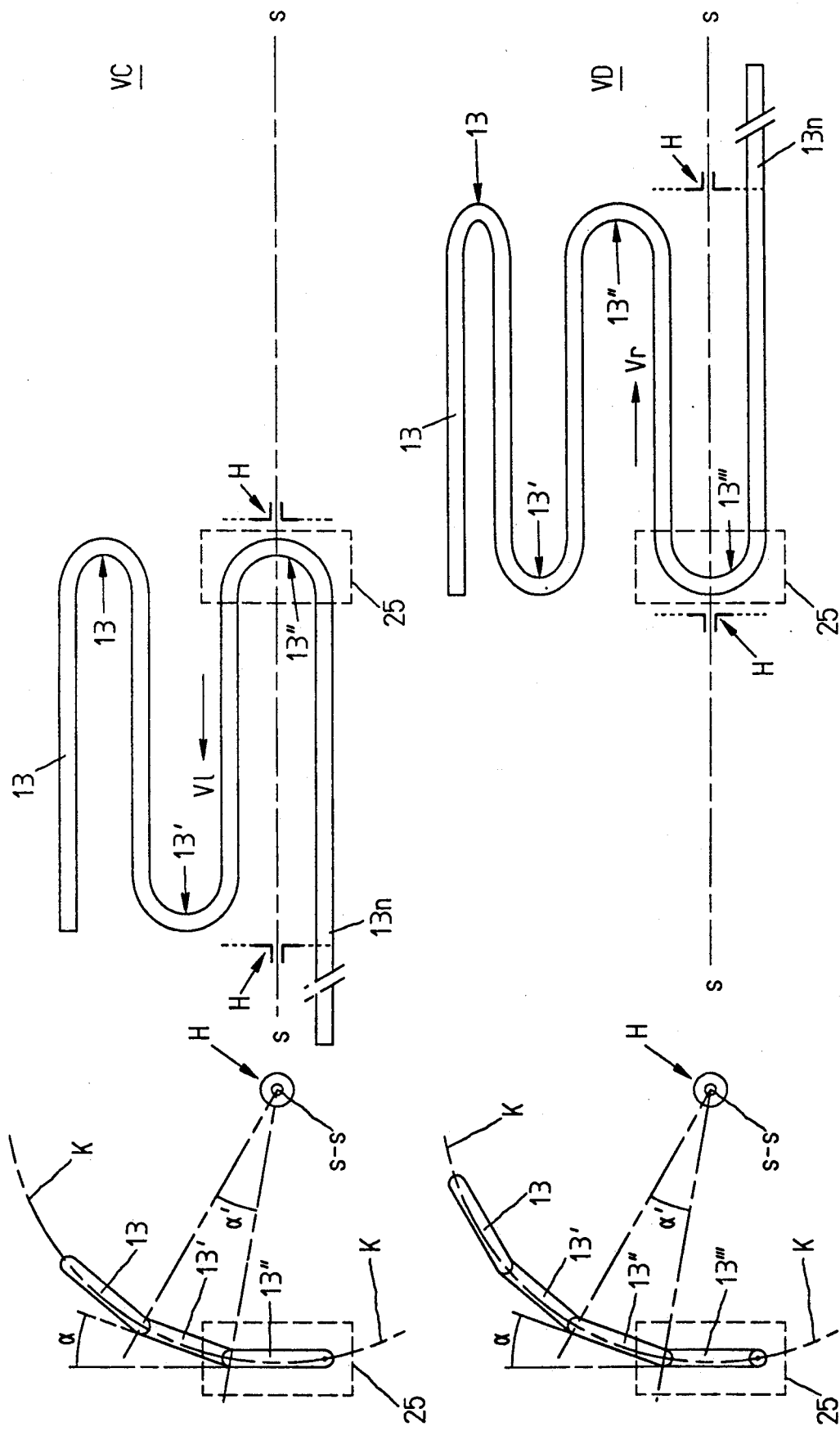

TEMPERATURE CONTROL DEVICE PROVIDED IN A PLASTIC-PROCESSING MACHINE

BACKGROUND OF THE INVENTION

1. Field of the Invention

This invention relates to a temperature control device provided in a plastic-processing machine, which comprises a plasticizing cylinder provided with a nozzle. The temperature control device comprises at least one pair of shell sections, each of which comprises an inside peripheral contacting surface and an outside peripheral surface, which is approximately concentric to the contacting surface. Strap means are provided, which force said shell sections against an outside peripheral surface of a part of the machine which is to be temperature-controlled. The shell sections of said pair or of each of said pairs constitute a heat transfer shell, which encloses the outside peripheral surface of the machine part. Each shell section consists of a metal casting and contains at least one temperature control element, which is embedded in the metal casting of said shell section and has been formed from linear tubes so that said temperature control element constitutes at least one loop having two linear legs and a curved bight connecting said legs. Said loop is approximately symmetrical to a generatrix of the shell section.

In that context the term "temperature control device" is used to describe a device which is adapted to transfer heat at such a rate and with such a timing to and from the plasticizing cylinder and the nozzle that the temperatures required in accordance with the working program of the machine will always be obtained.

The term "tubular temperature control element" is used to describe an element which supplies or extracts thermal energy. In the former case that element consists of a bent resistance heating tube, in which at least one resistance wire is approximately centrally embedded in a powder which is electrically insulating but has a high thermal conductivity. In the second case the element consists of a metal pipe for conducting a liquid coolant.

The invention relates also to a process of manufacturing such a temperature control device.

2. Description of the Prior Art

A temperature control device of that kind is known from U.S. Pat. No. 3,317,958. In that known device, each shell section of the heat transfer shell contains two radially offset temperature control elements, one of which is a tubular heating element and the other a tubular cooling element. The two temperature control elements permit an optimum operating temperature in a relatively large temperature range to be maintained in an object which is to be heated. The wall thickness of each shell section is related to the diameters of the tubular heating element and of the associated cooling element contained therein as 6:1 and 3.5:1, respectively. This means that the known shell section has a relatively large wall thickness and, as a result, a high stiffness so that it is difficult to establish a snug contact between the contacting surface of the shell sections and the outside peripheral surface of the cylindrical object which is to be heated even if additional measures are adopted to reduce the stiffness of said shell sections. For that purpose each shell section of the known device is formed with axial grooves although such grooves result in a higher flexibility only close to the axial grooves rather than in the sectors between the axial grooves.

It is conventional in injection molding machines that the tubular resistance heating elements may directly be pressed onto the outside peripheral surface of the plasticizing cylinder (see e.g., DE 37 36 612 A1; U.S. Pat. Nos. 4,730,937, 4,479,048).

SUMMARY OF THE INVENTION

It is a first object of the invention to provide a temperature control device which is of the kind described first hereinbefore and which can economically be manufactured and is operable to effect a temperature change at a higher rate particularly because its shell sections are relatively flexible and have only a small wall thickness so that a closer contact for heat transfer can be established.

It is a second object of the invention to provide an improved heat transfer shell section for use in a temperature control device as outlined in the preceding paragraph.

A third object of the invention is to provide an economical process of manufacturing a heat transfer shell section as outlined in the preceding paragraph.

That object is accomplished in that a single temperature control element is embedded in the metal casting of each shell section and has locating surfaces and each shell section is formed in its inside and outside peripheral surfaces with recesses to which said locating surfaces are exposed.

Owing to that design the quotient of the wall thickness of the shell section divided by the diameter of the temperature control element is approximately 2. This means that the wall thickness of the shell section is only about twice the diameter of the temperature control element or is even smaller than twice said diameter.

In order to minimize the wall thickness of the shell section the molten metal, such as aluminum, which is used to cast the shell section may be injected under a very high pressure up to 1300 bars into a die casting mold, in which the temperature control element is absolutely reliably clamped between the halves of the mold. Such clamping will ensure that the position of the temperature control element will not be changed by the action of the liquid metal as it flows into the mold at a high velocity. An injection at an extremely high velocity is necessary because only a small amount of metal is required to form the shell section within the relatively small cavity of the mold and owing to the relatively large area of the inside surface which defines the mold cavity that small amount of metal will be cooled quickly. For this reason the casting operation must be carried out in such a manner that it will be completed, as a rule, in few seconds or less. In order to ensure that the mold cavity will completely be filled within that short time the temperature control element must be disposed in the mold cavity in such a position that the liquid metal can flow through the small gaps between the loops of the temperature control element and the adjacent inside surfaces defining the mold cavity so that the spaces between the linear legs of the loops will also be filled quickly and completely. Because the mold cavity can quickly be filled by die casting under very high injection pressures, the contacting surface will have a high quality, i.e., a high smoothness, for effecting an intimate contact.

As a result, a subsequent machining of the heat transfer shell by a time-consuming grinding or milling will usually not be required.

In the mold, the exposed locating surfaces of the temperature control element bear on mating riblike or cylindrical projections integrally formed on the inside surfaces of the mold so that the temperature control element will be retained in position. The above-mentioned recesses, to which the locating surfaces are exposed, are complementary to said projections. Because the wall thickness of the shell sections is minimized, the amount of metal which is to be cast for making the shell sections will substantially be reduced and the plasticizing cylinder will be lighter in weight, as is urgently desired.

In each shell section the locating surfaces of the temperature control element are exposed to the atmosphere so that particularly at high temperatures the locating surfaces may be more susceptible to corrosion, particularly when they are heated to high temperatures. But that disadvantage is more than offset by the advantages which are afforded by the invention. Besides, any corrosive action which might be due to an electric potential difference between the metal of the shell section and the metal of the temperature control element may be avoided in that the metal which constitutes the surface of each temperature control element at least at the locating surfaces has in the electrochemical potential series a position which is at least as high as or higher than the position of the metal of the casting in which the temperature control element is embedded.

Within the scope of the invention each of the meandering temperature control elements of the shell sections mounted on the plasticizing cylinder may comprise a plurality of loops, which extend in respective planes, which are obtuse-angled to each other and are at right angles to adjacent radial planes of the plasticizing cylinder, and the distance of the bight from the outside peripheral surface of the shell section, measured in the radial direction of the plasticizing cylinder, is a multiple of the distance from said bight to the inside peripheral surface of the shell section, measured in the same radial direction. In that case, exactly shaped meandering temperature control elements comprising a plurality of loops each may be made by means of a simple automatic bending machine. It has been found that in a heat-supplying tubular temperature control element which consists of a resistance heating tube in which the bights of the loop are symmetrical with respect to a plane, a permanent deformation often can be achieved only with difficulty, particularly if the bights (13b) are additionally bent at right angles to that plane in adaptation to the radius of the object that is to be heated. Such a design has been adopted for the resistance heating tube 29 shown in FIGS. 2 and 6 of U.S. Pat. No. 3,317,958. When the loops have been bent twice adjacent to their bights, considerable springback forces having various strengths have often been encountered and have had the result that the linear legs of the loops are no longer parallel but have departed from their original positions resulting from the bending operation. Such a springback will substantially be avoided if the design is adopted which is recited in the first part of this paragraph because the bights need to be bent only in one plane and need not be adapted to the radius of the plasticizing cylinder in a further bending operation, which would result in a particularly strong springback. For this reason that design is desirable because an exactly shaped temperature control element will be required in the heat transfer shell section owing to its small wall thickness.

In the known temperature control device of the kind described first hereinbefore each shell section comprises two temperature control systems, which are radially offset from each other and consist of a heating system and a cooling system. In accordance with the invention, each shell section contains only a single temperature control element, which consists of a heating element or of a cooling element, as may be required. The heating element and the cooling element have suitably the same design, just as the shell sections containing them, so that a more economical manufacture and stockkeeping will be enabled.

BRIEF DESCRIPTION OF THE DRAWING

FIG. 4 is on a somewhat smaller scale a sectional view taken on line 4—4 in FIG. 2.

FIG. 5 is a side elevation showing two sections of a heat transfer shell for use on the plasticizing cylinder.

FIG. 6 is a top plan view showing a shell section of a heat transfer shell for use on the plasticizing cylinder.

FIG. 7 is an enlarged view showing the shell section of FIG. 6 when the clamping straps have been removed.

FIGS. 7a and 7b are sectional views taken on lines 7a—7a and 7b—7b in FIG. 7.

FIG. 7c is a side elevation showing the shell section of FIG. 7.

FIGS. 8 to 10 are, respectively, an end elevation, inside view and top plan view showing a shell section of a heat transfer shell for use on the nozzle.

FIG. 11 shows a temperature control element which is intended to be embedded in a cast shell section as shown in FIGS. 8 to 10.

FIGS. 13 to 16 are views which correspond to FIGS. 8 to 11, respectively, and show a shell section of a heat transfer shell of the temperature control device of FIG. 12 and the temperature control element associated therewith.

FIG. 21 and FIG. 22, consisting of FIGS. 22a and 22b, are diagrammatic views illustrating the process of manufacturing the temperature control device.

DETAILED DESCRIPTION OF THE PREFERRED EMBODIMENTS

Figure 1:
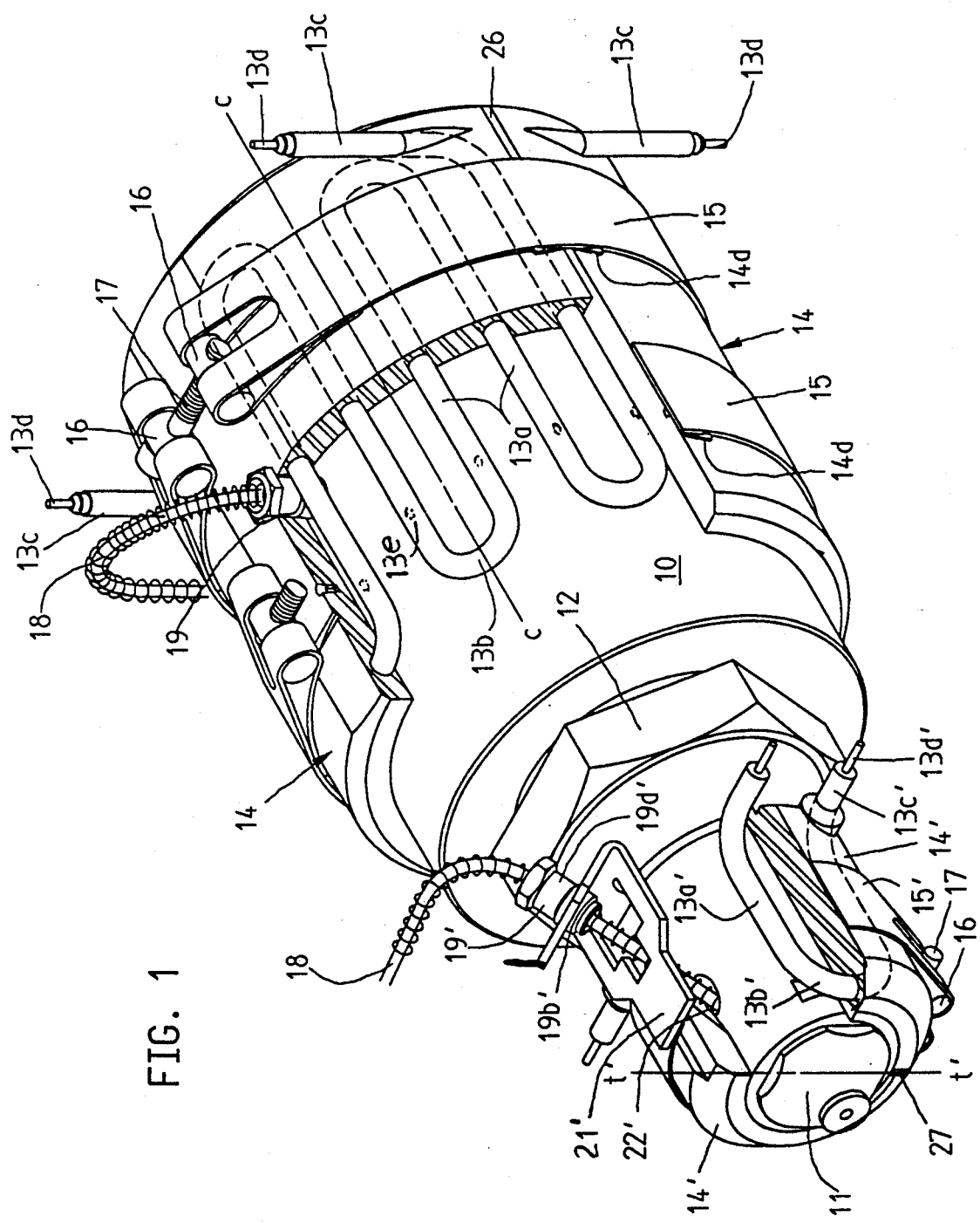
FIGS. 1 and 2 are, respectively, a perspective view and a vertical sectional view on a plane containing the injection axis and show the discharge end portion of the plasticizing cylinder and the associated nozzle.

The invention will now be explained with reference to the drawing.

Figure 2:
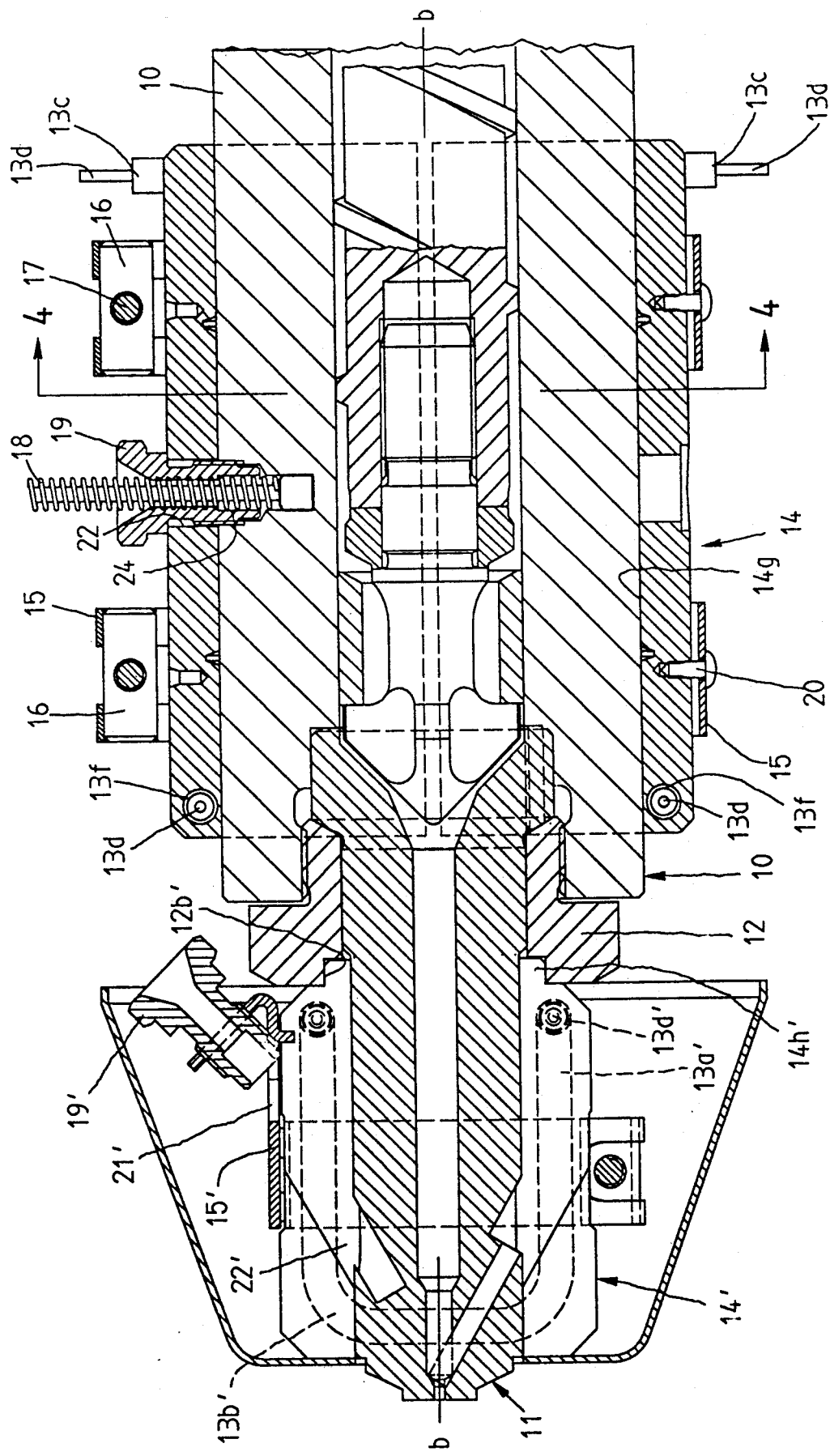
Figure 12:
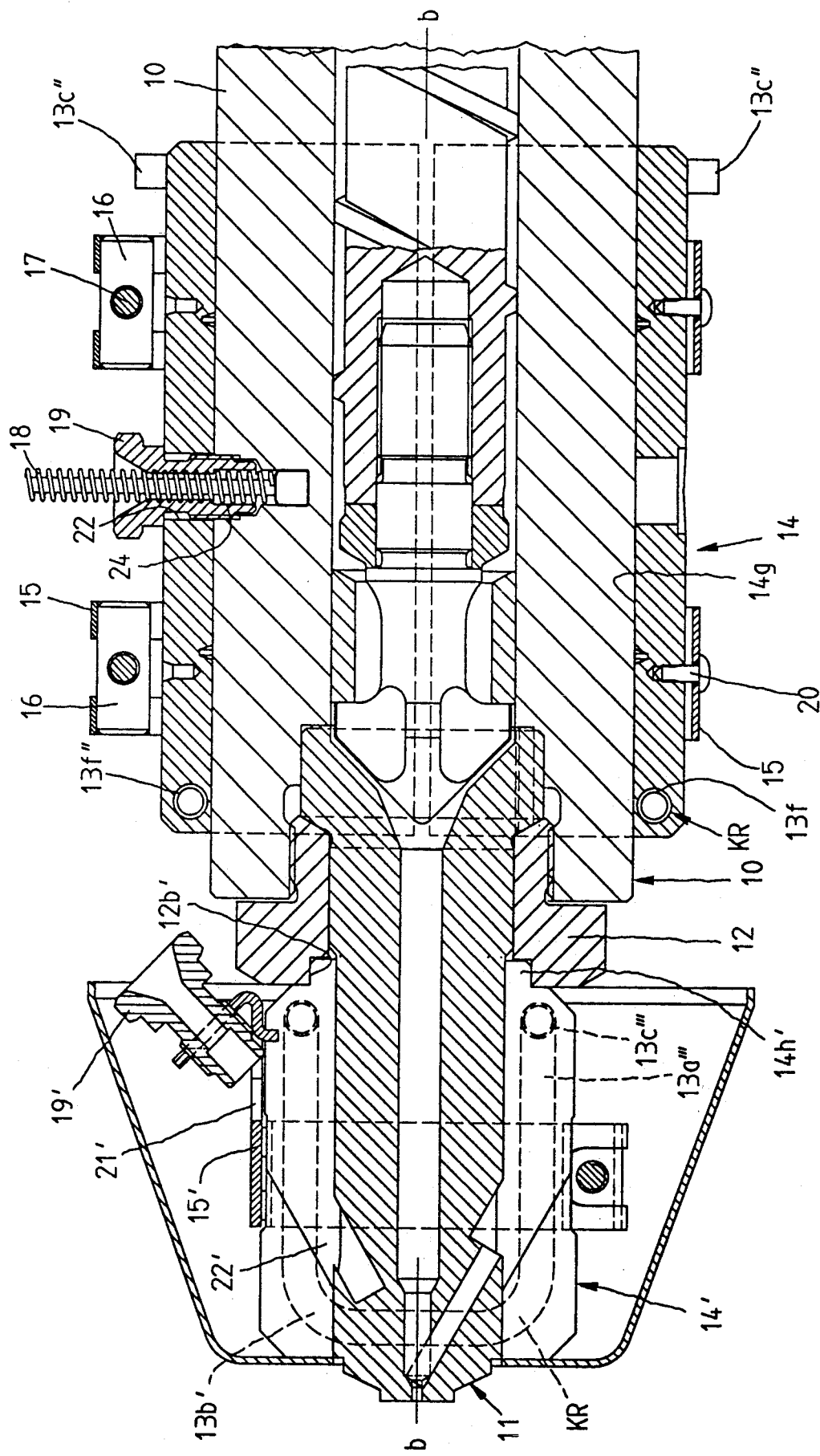
FIG. 12 is a view that is similar to FIG. 2 and illustrates a modified temperature control device.

In the embodiment shown by way of example, temperature control devices are associated with the plasticizing cylinder and with the associated nozzle of an injection molding machine. The temperature control device associated with the plasticizing cylinder will be described first. That temperature control device essentially comprises heat transfer shells, which surround the plasticizing cylinder 10 and consist each of two semicylindrical shell sections 14. In dependence on the length of the plasticizing cylinder 10, a plurality of axially aligned heat transfer shells are provided on the plasticizing cylinder 10. Only the heat transfer shell which is next to the nozzle is shown on the drawing. Each of the shell sections 14 has an inside peripheral contacting surface 14g and an outside peripheral surface, which is substantially concentric to the contacting surface. The two shell sections 14 of each heat transfer shell can be forced by means of two releasable clamping straps 15 against the outside peripheral surface on which the temperature of the plasticizing cylinder 10 is to be controlled. Each shell section 14 consists of a metal casting, in which a single temperature control element is embedded. That temperature control element has been formed from a linear tube to comprise a plurality of loops 13. Each loop 13 comprises two linear legs 13a and a bight 13b. Each loop 13 is approximately symmetrical to a generatrix c—c of the plasticizing cylinder 10 and to a generatrix of the shell section 14. Each temperature control element has exposed locating surfaces 13e, which are not covered by the metal of the casting but are exposed to inner and outer recesses or grooves 14e, 14f (FIGS. 7, 7a to 7c, 9, 14), which are formed in the inside and outside peripheral surfaces of the shell section 14. At least adjacent to the locating surfaces 13e the surface of each temperature control element is constituted by a metal which in the electrochemical potential series occupies a position which is at least as high as or higher than the position occupied by the metal of the casting in which the temperature control element is embedded. The loops 13 of the meandering temperature control element extend in planes e—e, which are obtuse-angled to each other and at right angles to associated radial planes s—s of the plasticizing cylinder 10 (FIGS. 3, 4, 7a, 7b). In the radial direction s—s, the bight 13b is spaced from the outside peripheral surface of the shell section 14 by a distance z (FIG. 3a) which is a multiple of the distance p (FIG. 3a) from the bight 13b to the contacting surface of the shell section. As is particularly apparent from FIGS. 5 and 6 the inner gorgelike grooves 14e which are formed in the contacting surface of the shell section 14 are axially offset from the gorgelike outer grooves 14f which are formed in the outside peripheral surface of the shell section 14. The extent of that axial offset is apparent from FIGS. 6 and 7. All grooves 14e and 14f extend in planes y—y (FIG. 5), which are at right angles to the longitudinal center line or injection axis b—b (FIGS. 1, 2). Each leg 13a of the loops 13 is exposed to at least two inner grooves 14e and to at least two outer grooves 14f. Each clamping strap 15 is provided at opposite ends with end loops 15b', which are trained around mounting pins 16, which are connected by a tensioning screw 17, which is axially adjustable for tensioning the strap 15. During the mounting of the temperature control device the clamping straps are guided and axially located by means of projections 14d provided on the outside peripheral surface of the shell sections 14. The clamping straps are adapted to be retained in the peripheral direction by locking pins 20. The joints between the two shell sections 14 of each heat transfer shell lie in a horizontal plane (parting plane t—t in FIGS. 3, 4). Each temperature control element has end ports 13c and 13c" (FIG. 12), which extend out of the shell section 14 at right angles to the parting plane t—t. As is particularly apparent from FIGS. 1 and 2, the upper shell section 14 of each heat transfer shell is formed with a through opening 22 for receiving a temperature detector 18, which comprises a thermocouple and is retained by a tubular mounting screw 19 and is axially adjustably held in the latter and surrounded by a coil spring which is in mesh with internal screw threads of the tubular fixing screw. As a result, the coil spring bearing on a shoulder of the temperature detector can be axially prestressed by a rotation of the fixing screw so that the temperature detector can axially be biased by the coil spring against the outside peripheral surface of the plasticizing cylinder.

The temperature control device provided on the nozzle will now be described.

That device comprises a heat transfer shell, which consists of two semicylindrical shell sections 14'. The shell is forced by a single clamping strap 15' against the outside peripheral surface of the nozzle 11. The joints 27 between the two shell sections 14' lie in a vertical plane (parting plane t—t in FIGS. 1, 3). Each shell section 14' contains a temperature control element, which includes a single loop 13' (FIGS. 8 to 11, 13 to 16) and two protruding linear end ports 13c' and 13''', which extend at right angles to the parting plane t—t. The end port 13c' is shown in FIGS. 1 to 11 and the end port 13''' in FIGS. 13 to 16. Adjacent to one vertical joint 27, the shell sections 14' are formed with recesses, which combine to form a through opening for receiving a temperature detector 18', which is held in position by means of a U-shaped retaining element 21', through which the tensioning screw 17' extends. The retaining element 21' partly surrounds a tubular mounting screw 19', in which the temperature detector is received, which is adapted to be axially biased against the outside peripheral surface of the nozzle by a coil spring surrounding the temperature detector and extending into the screw 19'. For use with a nozzle as shown in FIGS. 1, 2, 8 and 11 the shell sections 14' are integrally formed with projections 14h', which engage a radial shoulder 13b, which is formed on the outside of a tubular screw 12, which connects the body of the nozzle 11 to the plasticizing cylinder 10. The clamping strap 15' is provided on a forward portion of the nozzle in front of the tubular screw 19' for retaining the temperature detector 18'. The bight 13b' of each temperature control element and the two linear legs 13a' thereof lie in a vertical plane.

In the illustrative embodiment shown in FIGS. 12 to 16 the clamping strap 15c' is provided on a rear portion of the nozzle adjacent to the temperature detector 18. For this reason the tubular mounting screw 19' extends through the clamping strap 15' in an aperture, which is formed in the strap 15' and is defined in front and at the rear by narrow webs 15c' of the clamping strap 15'. As is particularly apparent from FIGS. 13 and 15 the bight 13b' of the temperature control elements has been bent outwardly out of the vertical plane which contains the linear legs 13a so that said bight 13b' extends generally along a radius of the cylindrical nozzle body.

In the embodiment shown in FIGS. 1 to 11 the temperature control elements consist of resistance heating elements. In the embodiment shown in FIGS. 12 to 16, cooling pipes KR are provided, which are flown through by a cooling fluid, which is supplied through the protruding end ports 13c" of the cooling pipes in the shell sections 14 provided on the plasticizing cylinder 10 and through the protruding end ports 13''' of the cooling tubes KR of the shell sections provided on the nozzle 11.

Figure 17:
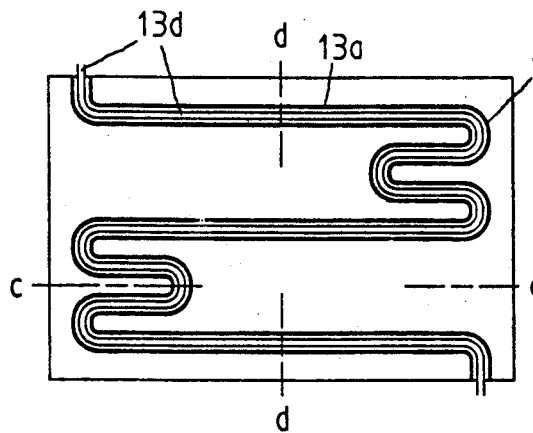
FIGS. 17 and 18 are diagrammatic views showing developments of two modified temperature control elements.
Figure 18:
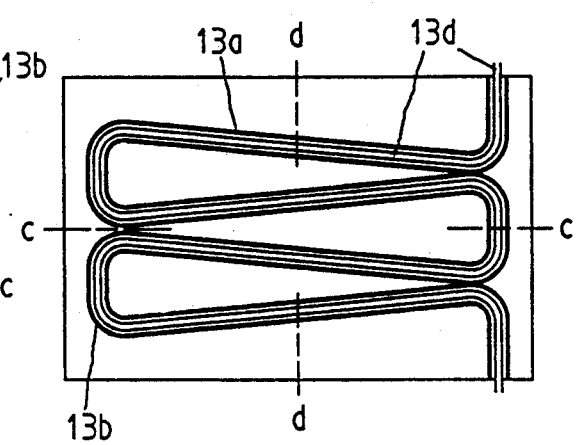
Figure 19:
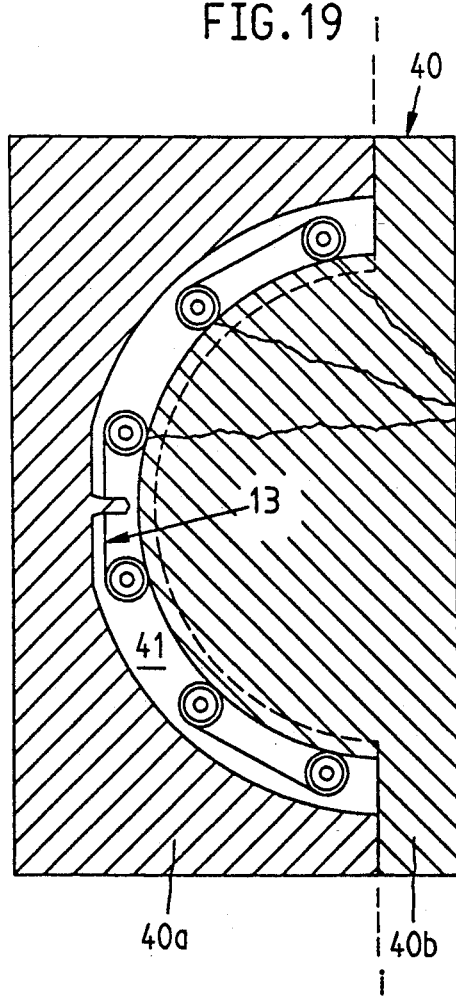
FIGS. 19 and 20 are diagrammatic sectional views which are taken on lines 7a—7a and 7b—7b, respectively, in FIG. 7 and show a mold and a temperature control element clamped in said mold.
Figure 20:
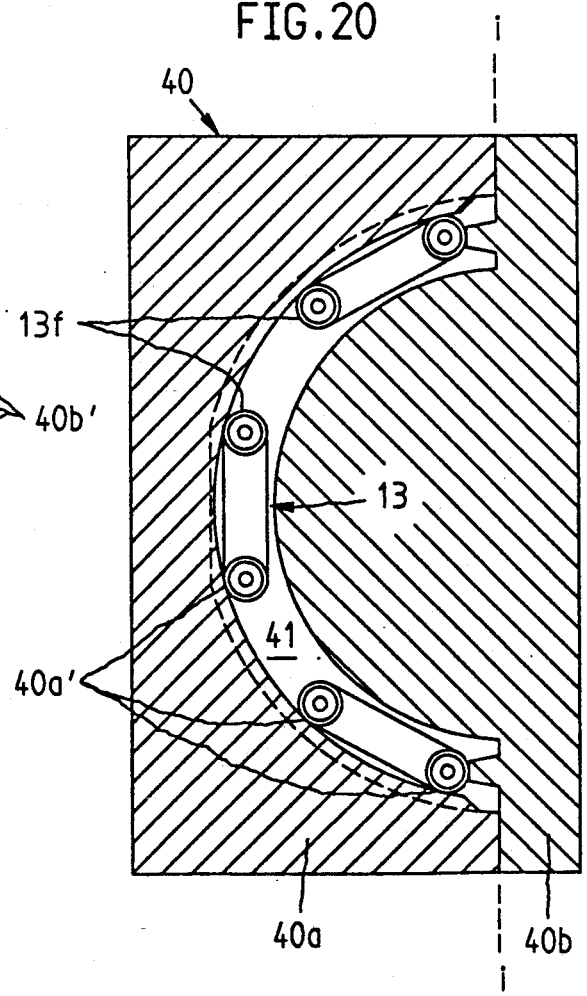

In accordance with FIG. 18 the loops have a design which permits a higher rate of heat transfer per unit of area to be achieved. In the embodiment shown in FIG. 17 the loops are so arranged that a higher heat transfer rate can be achieved in selected regions. In that case the loops 13 are also symmetrical to generatrices c—c of the plasticizing cylinder and to generatrices of the heat transfer shells.

A much higher heat transfer rate can be achieved if the resistance wire in the tube 13f is helically coiled. In that case the temperature control elements will be larger in diameter. No heat is generated in the protruding end ports 13c, 13c' of those temperature control elements which consist of heating tubes.

The process of manufacturing the heat transfer shell sections of the temperature control device will now be described with reference to FIGS. 19 to 22. The mold is diagrammatically shown in FIGS. 19 and 20 in sectional views taken on planes which are spaced the distance r in FIGS. 6 and 7c apart and which correspond to the planes y—y which contain the recesses 14f and 14e in the complete heat transfer shell section shown in FIGS. 7a and 7b. For this reason only those riblike projections 40b' which engage the inner locating surfaces 13f of the temperature control element are apparent in FIG. 19 and only those projections 40a' which engage the outer locating surfaces 13f of the temperature control element are apparent in FIG. 20.

Figure 21:
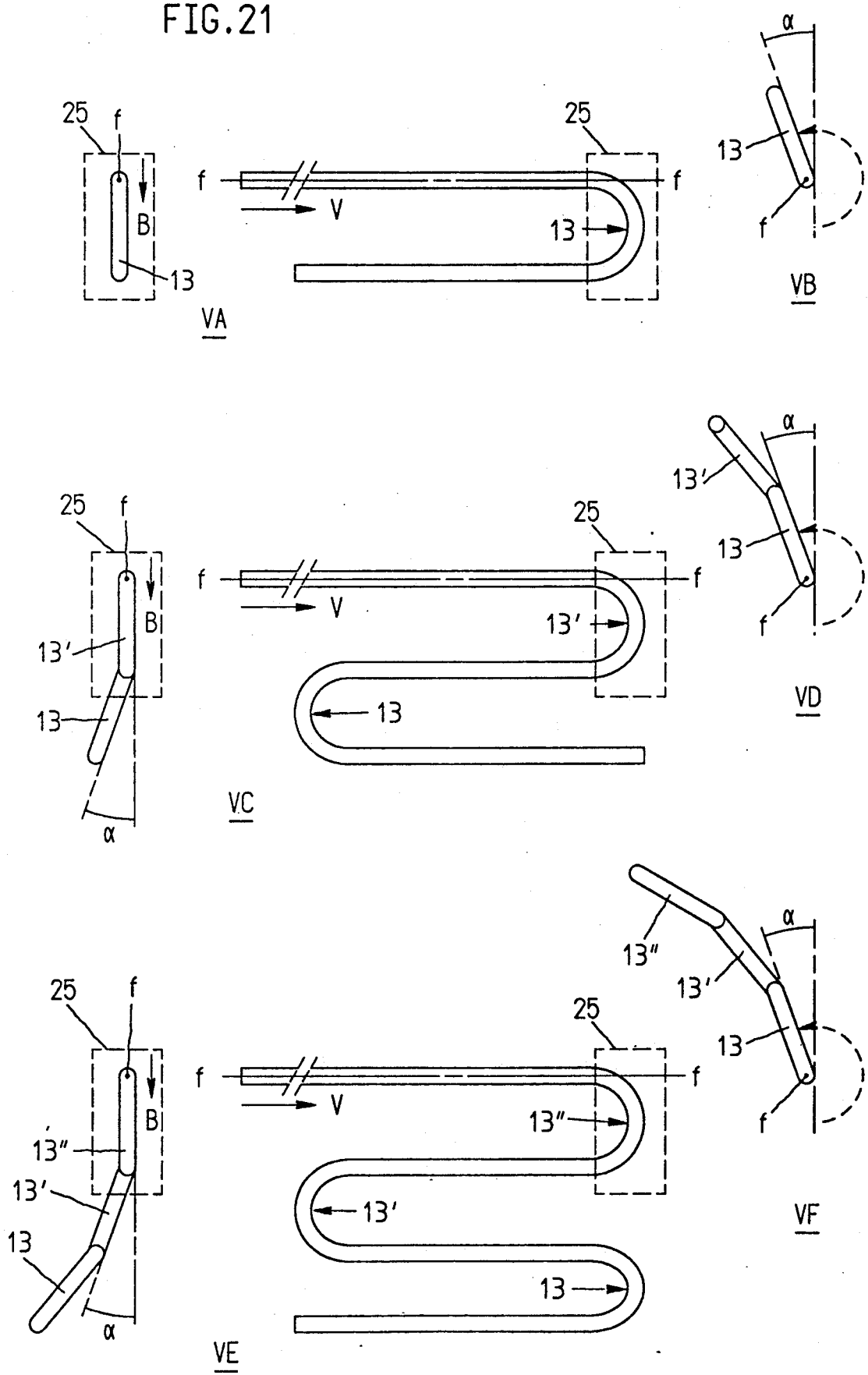

FIGS. 21 and 22 are diagrammatic representations of stages VA, VB, VC etc. which have been reached in the process in order to illustrate certain process steps. In stages VA, VC and VE the temperature control element is diagrammatically shown in an end elevation and in a side elevation, also in the stages VA, VB, VC and VD in FIG. 22.

In the process, straight tubular blanks for temperature control elements consisting of resistance heating tubes or cooling tubes are deformed to form meandering temperature control elements, each of which comprises a plurality of loops 13, each of which comprises a bight 13b and two linear legs 13a. Each of said temperature control elements is then clamped in a mold 40 between projections 40a' and 40b' of respective mold halves 40a, 40b. Said projections 40a' and 40b' protrude into the mold cavity and engage the temperature control element on mutually opposite sides at locating surfaces 13e, 13e'. The liquid metal preferably consisting of aluminum is then injected into the mold cavity 41 under an injection pressure between 500 and 1300 bars within four seconds, at most. Alternatively, the injecting operation may last only a fractional part of a second if a proper design has been adopted for the mold cavity 41 and for the meandering temperature control element which is clamped in the mold. When the heat transfer shell sections have been removed from the molds, said shell sections are fixed in pairs to the plasticizing cylinder 10 or to the nozzle 11 by means of the clamping straps to provide heat transfer shells.

Two variants of a process will now be described which may be used to manufacture heat transfer shell sections which are to be mounted on the plasticizing cylinder and each of which contains a temperature control element comprising a plurality of loops, which extend in respective planes, which are obtuse-angled to each other. Pairs of said shell sections are adapted to be mounted on the plasticizing cylinder in such a manner that said planes are at right angles to adjacent radial planes of the plasticizing cylinder, and the distance of the bight from the outside peripheral surface of the shell section, measured in the radial direction of the plasticizing cylinder, is a multiple of the distance from said bight to the inside peripheral surface of the shell section, measured in the same radial direction.

In the first variant, illustrated in FIG. 21, the process comprises the following steps:

1. A commercially available linear tubular blank for a temperature control element is mounted to be rotatable about its axis (axis of rotation f—f) and to be axially displaceable in a direction V.

2. The thus mounted blank is reversely bent through 180° at a free end portion by means of a bending apparatus 25 to form a first loop extending in a predetermined direction (bending direction B).

After said two process steps the stage VA indicated in FIG. 21 has been reached in the process.

Figure 3:
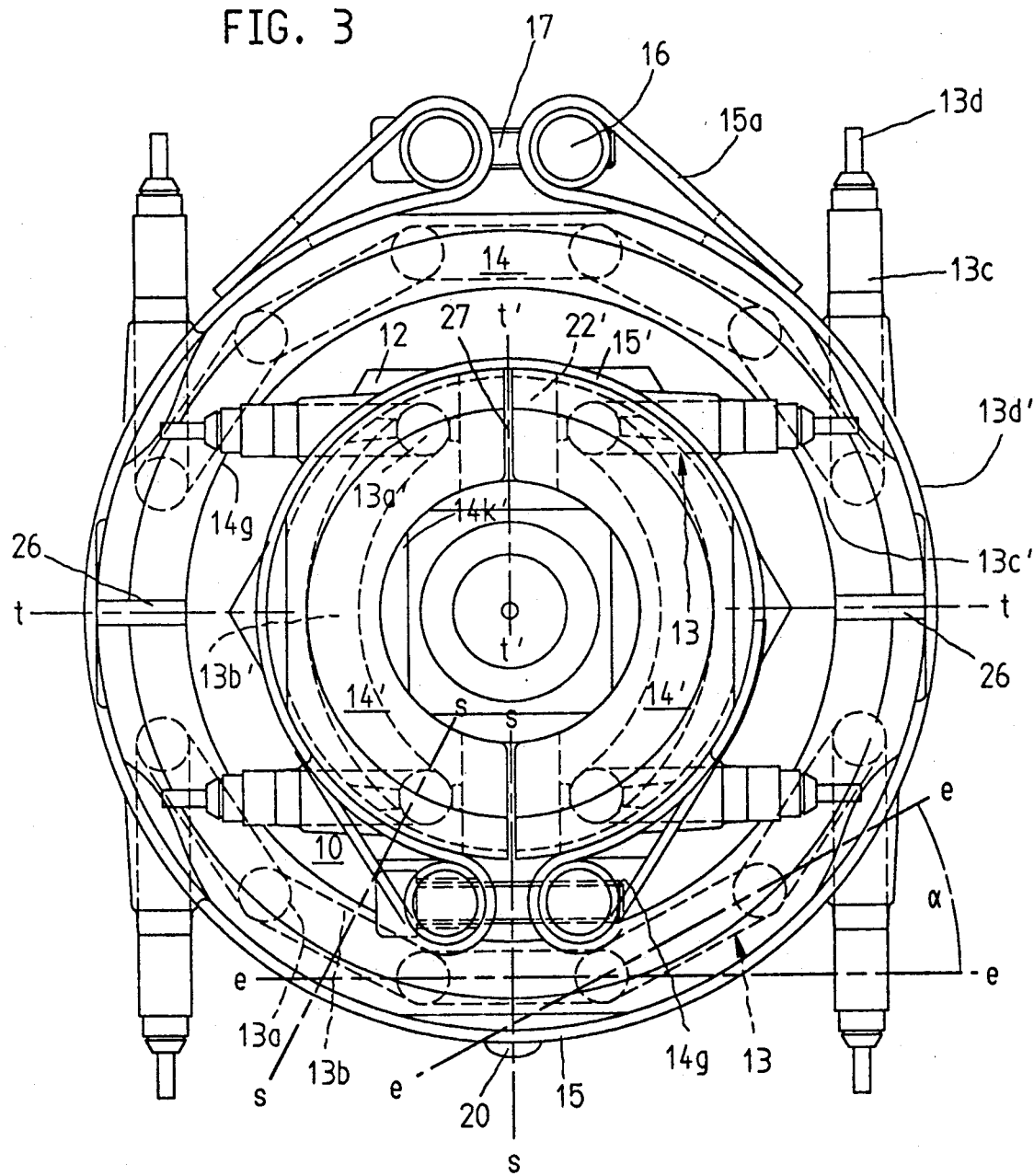
FIG. 3 is an enlarged end view showing the arrangement of FIGS. 1 and 2.
Figure 3A:
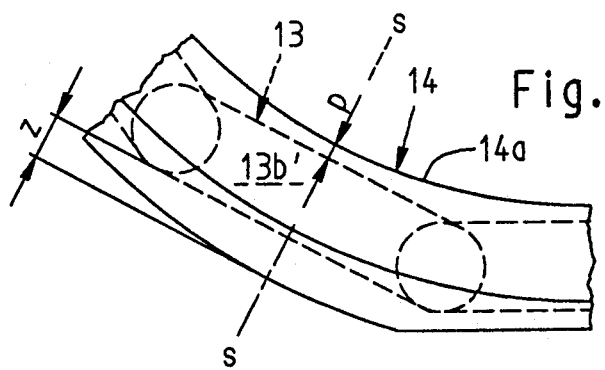
FIG. 3a is a fragmentary view showing a portion of the arrangement of FIG. 3.

3. The blank which has been deformed at one end is axially displaced in the direction V along the axis of rotation f—f to the extent of the length of one loop and is then rotated about the axis of rotation s—s through a center angle of 180° plus an acute angle α (FIG. 3). The angle α is included between the planes e—e of adjacent loops (FIGS. 3, 4, 7a, 7b).

The stage VB indicated in FIG. 21 has now been reached in the process.

4. At its deformed end portion including the first loop 13 the blank is reversely bent through 180° in the bending direction B so as to form a second loop 13'.

The stage VC indicated in FIG. 21 has now been reached in the process.

5. The thus deformed blank is once more axially displaced along the axis of rotation f—f to the extent of the length of one loop and is rotated about the axis of rotation f—f by a center angle of 180° plus the angle α.

The stage VC indicated in FIG. 21 has now been reached in the process.

6. At its deformed end portion including the first loop 13 and the second loop 13' the blank is reversely bent through 180° by means of the bending apparatus to form a third loop 13'''.

The stage VE indicated in FIG. 21 has now been reached in the process.

7. The deformed blank is then axially displaced along the axis of rotation f—f to the extent of the length of one loop and is then rotated about the axis of rotation f—f through a center angle of 180° plus the angle α.

The stage VF indicated in FIG. 21 has now been reached in the process.

That stage may be succeeded by steps which are similar to those described hereinbefore and serve to form additional loops.

It will be understood that identical temperature control elements will be formed in the process if the rotation of the blank through 180° plus the angle α in various process steps is replaced by a corresponding rotation of the bending apparatus so that the process is kinematically inverted as regards the rotatory motions.

A meandering temperature control element for a heat transfer shell section of the kind described may alternatively be made in a process which is illustrated in FIG. 22 and comprises the following steps:

1. A commercially available, linear tubular blank for a temperature control element is mounted in a holding device rotable about an axis (axis of rotation s—s) and axially displaceable in this axis in opposite directions, whereby the blank eccentrical disposed to the axis of rotation s—s is received in a bending apparatus 25 in a position ready for bending.

2. The thus mounted blank is reversely bent through 180° at a free end portion by means of the bending apparatus 25 to form a first loop 13 extending in a predetermined direction in a bending plane B'.

After said two process steps the stage VA indicated in FIG. 22 has been reached in the process.

3. The blank which has been deformed at one end is axially displaced together with the holding device H in a predetermined direction Vr parallel to the axis of rotation s—s to the extent of the length of one loop and moved on a circular line K by turning the holding device H about the axis of rotation s—s by a center angle $\alpha'$ in such a way that the linear section 13$n$ of the blank is received in the bending apparatus 25 in a position ready for bending.

4. At its linear section 13$n$ the blank is reversely bent through 180° in the bending plane B' in a direction, which is opposite to the direction by forming the first loop 13 so as to form a second loop 13'. The stage VB indicated in FIG. 22$a$ has now been reached in the process.

5. The thus deformed blank is once more axially displaced together with the holding device H in a opposite direction Vl parallel to the axis of rotation s—s to the extent of the length of one loop and moved on a circular line K by turning the holding device H about the axis of rotation s—s by a center angle $\alpha'$ in such a way that the linear section 13$n$ of the blank is received in the bending apparatus 25 in a position ready for bending.

6. At its linear section 13$n$ the blank is reversely bent through 180° in the bending plane B' in a direction which is opposite to the direction by forming the second loop 13' so as to form a third loop 13''.

The stage VC indicated in FIG. 22$a$ has now been reached in the process.

7. The thus deformed blank is once more axially displaced together with the holding device H in a opposite direction Vl parallel to the axis of rotation s—s to the extent of the length of one loop and moved on a circular line K by turning the holding device H about the axis of rotation s—s by a center angle $\alpha'$ in such a way that the linear section 13$n$ of the blank is received in the bending apparatus 25 in a position ready for bending.

8. At its linear section 13$n$ the blank is reversely bent through 180° in the bending plane B' in a direction, which corresponds with the direction by forming the second loop 13', so as to form a fourth loop 13'''. The stage VD indicated in FIG. 22$b$ has now been reached in the process.

In both processes illustrated in FIG. 21 and 22 a stationary bending apparatus is bending in a single plane.

In the process illustrated in FIG. 22 the directions of the axially displacement of the holding device H and of the bending changes reciprocally, whereby the loops are formed by bending the linear section of the temperature control element. The angle $\alpha$ between the planes e—e (FIG. 3) of adjoining loops and the centre angle $\alpha'$ of turning the holding device step by step are depending on the number of loops 13 in the temperature control element.

I claim:

1. In a plastic processing machine including
   a plasticizing cylinder having an outer cylindrical surface and a longitudinal center line; and
   a temperature control device circumferentially surrounding the plasticizing cylinder for controlling the temperature thereof;
   the improvement wherein said temperature control device comprises
   (a) a heat transfer shell circumferentially fully surrounding the plasticizing cylinder along a length portion thereof; the shell consisting of two semicylindrical cast metal shell sections each having an inner and an outer peripheral surface; said inner peripheral surface of each said shell section being in a face-to-face engagement with the outer cylindrical surface of the plasticizing cylinder;
   (b) a single tubular temperature control element embedded in each said shell section; each said temperature control element having a plurality of consecutive loops, each formed of two linear legs and a bight interconnecting the legs; each said loop being symmetrical to a generatrix of the shell section accommodating the loop; further wherein adjoining said loops in each said shell section extend in planes oriented at an obtuse angle to one another and perpendicularly to planes halving a distance between adjoining legs and containing said longitudinal center line; further wherein a radial distance of the bight of each loop from said outside peripheral surface of the respective shell section is a multiple of a radical distance thereof from said inner peripheral surface of the respective shell section;
   (c) a plurality of outer recesses formed in the outer peripheral surface of each said shell section and a plurality of inner recesses formed in the inner peripheral surface of each said shell section; each said leg being intersected by at least two of said outer recesses and by at least two of said inner recesses at respective locations of intersection; each said leg having outer and inner locating surfaces being exposed to the respective outer and inner recesses at said locations of intersection; and
   (d) clamping strap means for surrounding circumferentially said heat transfer shell and for exerting a radially inwardly directed force on said shell sections for urging said inner peripheral surface of each said shell section against the outer cylindrical surface of said plasticizing cylinder.

2. A plastic processing machine as defined in claim 1, wherein said shell has a radially measured thickness and said temperature control element has a tube diameter; further wherein said tube diameter is approximately one half of said thickness.

3. A plastic processing machine as defined in claim 1, wherein said outer recesses are axially offset from said inner recesses; and further wherein said outer and inner recesses extend in planes oriented perpendicularly to said longitudinal center line.

4. A plastic processing machine as defined in claim 1, wherein said longitudinal center line is horizontally oriented; further wherein the two shell sections meet at joints extending in a horizontal plane; and further wherein each said temperature control element has two linear end ports projecting vertically from a respective said shell section.

5. In a plastic processing machine including
   a plasticizing cylinder;
   a nozzle mounted on the plasticizing cylinder and having an outer cylindrical surface; and a temperature control device circumferentially surrounding the nozzle for controlling the temperature thereof;

the improvement wherein said temperature control device comprises (a) a heat transfer shell circumferentially fully surrounding the nozzle along a length portion thereof; the shell consisting of two semicylindrical cast metal shell sections each having an inner and an outer peripheral surface; said inner peripheral surface of each said shell section being in a face-to-face engagement with the outer cylindrical surface of the nozzle; said shell sections meeting at joints extending in a vertical plane;

(b) a single tubular temperature control element embedded in each said shell section; each said temperature control element having a single one loop formed of two linear legs and a bight interconnecting the legs; each said loop being symmetrical to a generatrix of the shell section accommodating the loop; each said temperature control element having two linear end ports projecting horizontally from a respective said shell section;

(c) a plurality of outer recessess formed in the outer peripheral surface of each said shell section and a plurality of inner recesses formed in the inner peripheral surface of each said shell section; each said leg having outer and inner locating surfaces being exposed to the respective outer and inner recesses at said locations of intersection of each said leg with said outer and inner recesses; and (d) clamping strap means for surrounding circumferentially said heat transfer shell and for exerting a radially inwardly directed force on said shell sections for urging said inner peripheral surface of each said shell section against the outer cylindrical surface of said nozzle.

6. A plastic processing machine as defined in claim 5, further wherein each said shell sections have recesses at one of said joints; said outer cylindrical surface of said nozzle being exposed through an opening formed by said recesses; further comprising a temperature detector extending through said opening; and mounting means for mounting said temperature detector against said outer cylindrical surface of said nozzle.

7. A plastic processing machine as defined in claim 6, wherein said mounting means comprises a U-shaped retaining member and a tubular mounting screw.

8. A plastic processing machine as defined in claim 5, wherein said clamping strap means comprises a flexible clamping strap having opposite ends and a tensioning means engaging said opposite ends for exerting a circumferential pulling force to said flexible clamping strap; said tensioning means comprising mounting pins for mounting the strap at said opposite ends and a tensioning screw adjustably interconnecting said mounting pins and extending through said retaining member.

9. A plastic processing machine as defined in claim 5, wherein said nozzle has an external vertical shoulder adjacent said outer cylindrical surface of said nozzle; further wherein said shell sections are identical; further comprising a projection formed on said inner peripheral surface of each shell section; the projections interengaging with said shoulder.

10. A plastic processing machine as defined in claim 5, wherein said shell has a radially measured thickness and said temperature control element has a tube diameter; further wherein said tube diameter is approximately one half of said thickness.

11. A semicylindrical heat transfer shell section for use in a temperature control device provided in a plastic processing machine around an outer cylindrical surface of a cylindrical part of the machine; comprising (a) a metal casting having an outer peripheral surface and an inner peripheral surface; said inner peripheral surface being adapted to snugly contact said outer cylindrical surface of the cylindrical part;

(b) a single tubular temperature control element embedded in said shell section; said temperature control element having a plurality of consecutive loops, each formed of two linear legs and a bight interconnecting the legs; each said loop being symmetrical to a generatrix of the shell section; further wherein adjoining said loops extending in planes oriented at an obtuse angle to one another and perpendicularly to planes halving the distance between adjoining legs and containing a longitudinal axis of the shell section; a radial distance of the bight of each loop from said outside peripheral surface of the shell section being a multiple of a radial distance thereof from said inner peripheral surface of the shell section; and (c) a plurality of outer recesses formed in the outer peripheral surface of said shell section and a plurality of inner recesses formed in the inner peripheral surface of said shell section; each said leg being intersected by at least two of said outer recesses and by at least two of said inner recesses at respective locations of intersection; each said leg having outer and inner locating surfaces being exposed to the respective outer and inner recesses at said locations of intersection.

12. A semicylindrical heat transfer shell section for use in a temperature control device as defined in claim 11, wherein said shell has a radially measured thickness and said temperature control element has a tube diameter; further wherein said tube diameter is approximately one half of said thickness.

* * * * *